Patented Jan. 9, 1951

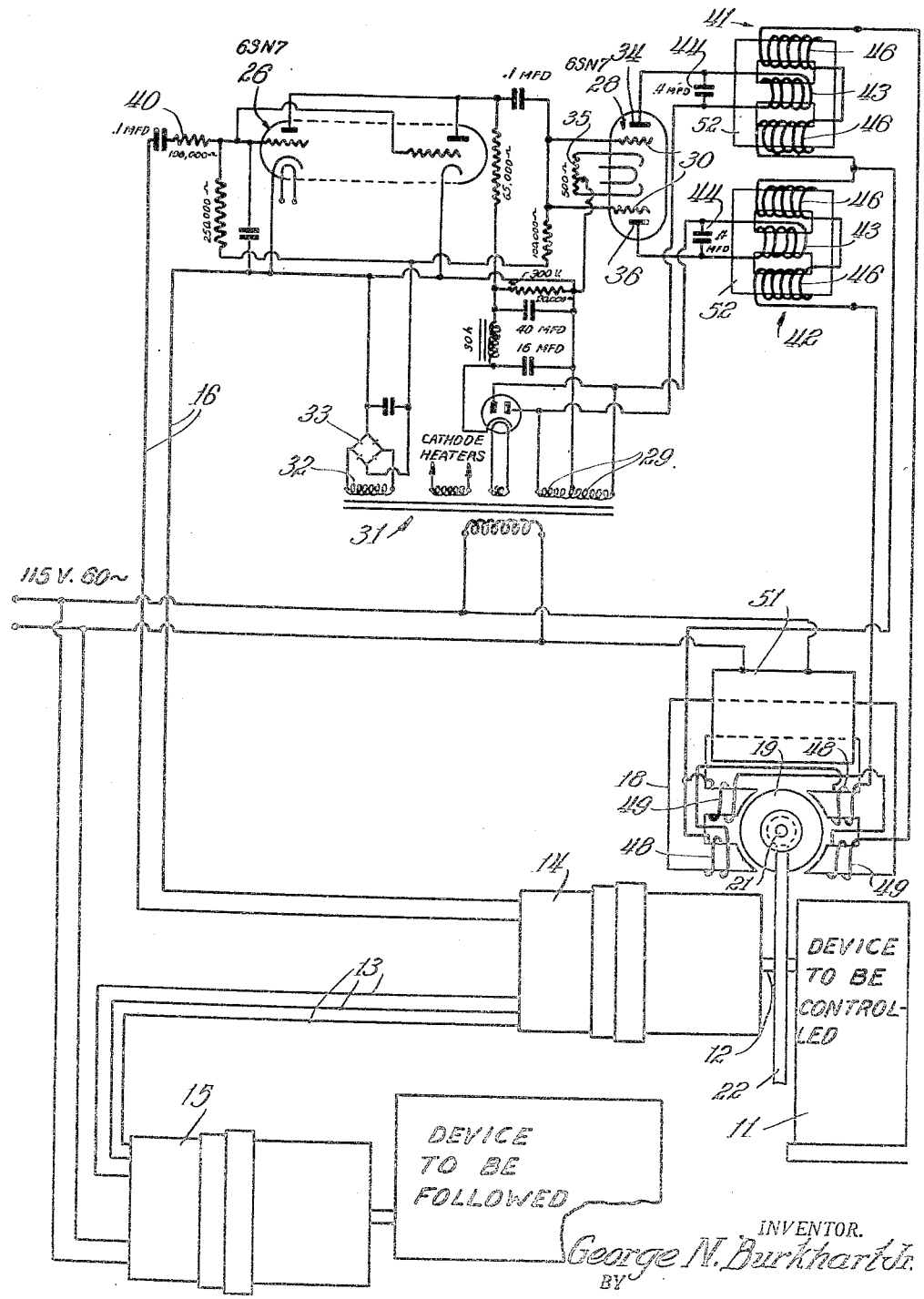

2,537,027

UNITED STATES PATENT OFFICE 2,537,027

FOLLOW-UP APPARATUS

George N. Burkhart, Jr., La Fayette, Ind., assignor to Duncan Electric Manufacturing Company, La Fayette, Ind., a corporation of Illinois Application February 8, 1947, Serial No. 727,421

4 Claims. (Cl. 318—30)

There are many situations in which it is desirable to drive a piece of apparatus accurately to a predetermined position from some other position on either side thereof and to control this drive by some element which is completely free of the load imposed on the driving motor. Quite often the position to which the apparatus is to be driven is varied more or less constantly either by manual control or by some form of automatic control.

For example, in various forms of navigational equipment it may be desired to have some part of the equipment driven from one position to another depending on the speed or the compass course of a ship. Appreciable power may be required to drive this part of the equipment, but it is desirable not to derive this power from the usual speed or direction responsive devices of the ship since to do so would produce inaccuracies.

Accordingly, it is a practice in such instances to provide a driving motor for the apparatus which for convenience may be called a follow up motor, and to control this motor by some system which may be called a follow up system which senses any disturbance in the correct relationship between the driven apparatus and the device which it is to follow and causes the motor to drive the apparatus in one direction or the other. Thus it is possible to follow up accurately the speed or direction indications received from the usual ship's instruments or such other indications as it may be desired to follow up in other types of apparatus.

Accordingly to the present invention, a simplified and extremely dependable follow up system is provided. One feature of the invention is in the simplified control of the follow up motor, free from contacts which could cause contact trouble. According to this feature a motor which is constantly energized is controlled by sets of shading coils, one set for one direction of rotation and one for the other direction, each set being controlled by a saturable reactor. The saturable reactors in turn are controlled by vacuum tubes responsive to the indication being followed, with or without intermediate amplification.

Additional objects and advantages will be apparent from the following description and from the drawing which is a diagrammatic representation of a follow up system chosen for an illustration of the present invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

In the drawing the numeral 11 represents any instrument which is to be controlled by the follow up system of this invention. In the illustrated application of the invention, the position of the shaft 12 of the instrument is to be controlled in accordance with indications received over wires 13 which are the input wires to a control transformer 14. These input wires may come from a synchrogenerator 15, which might be connected to a ship's navigational apparatus and may indicate the ship's speed or its compass direction.

The control transformer 14 may be of any type. One type which is at present preferred is the Bendix type 1—CT. In this type of control transformer a voltage will be impressed on output wires 16 unless the shaft 12 is in exactly the position indicated by the indications received over wires 13. The instantaneous polarity of the voltage impressed on output wires 16 will depend upon the direction which shaft 12 is displaced from its correct position.

A follow-up motor 18 provided for driving the shaft 12 to its correct position. This motor is provided with a rotor 19 which in the illustrated form drives a worm gear 21, which in turn drives a worm wheel 22. In practice, the rotor 19 may more often be connected to shaft 12 by spur gears so as to have less backlash and power loss. The instrument 11 to be controlled will also be driven by motor 18, being driven in the illustrated form by the same shaft 12

The present invention is concerned with controlling a motor such as the motor 18 in response to the voltages applied to output wires 16 by the control transformer 14, or by any other control device.

According to the present invention, voltages on wires 16 are applied to the control grid of the input tube 26 of an amplifier. The preferred circuit and constants of the amplifier are shown in the drawing and, hence, need not be described in detail. The two parts of tube 26 are connected in parallel. A single type tube such as 6J5 could be used but the twin type is preferred for greater dependability and so that both tubes will be of the same type.

The output of the input stage is applied through a capacitance coupling to the control grids 30 of the output tube 28.

With weaker inputs another stage of amplification might be desired. With the apparatus indicated, however, it has been found desirable to cut down the input with resistance 40.

The two plate circuits of tube 28 are energized with opposite polarity by secondary coil 29 of power transformer 31 energized by the same source which energizes synchro-generator 15 and control transformer 14. In other words, the center tap of the secondary coil 29 is connected to both cathodes of tube 28, but plate 34 is energized from one end of coil 29 while plate 36 is energized from the other end. The grids 30 may be suitably biased by a secondary coil 32 on transformer 31 operating through a rectifier 33.

Plate 34 is connected with saturable reactor 41 while plate 36 is connected to saturable reactor 42, in each instance the connection being through one of the saturating coils 43. Since these coils are in the plate circuits of tube 28, the current through them will be uni-directional. The impulses therein due to the alternating impressed voltage are largely leveled out by the condensers 44.

The reactance coils 46 on the saturable reactors 41 and 42 are connected in series with shading coils on the motor 18. Thus the reactance coils 46 of saturable reactor 42 are connected across shading coils 48, which are connected in the circuit in series. Likewise reactance coils 46 of the other saturable reactor 41 are connected across shading coils 49 of motor 18, these coils being connected in their circuit in series.

As is well known in motors of this type a short circuiting of the shading coils 48 will cause the rotor 19 to rotate in one direction, assuming the main field coil 51 is energized, while the short circuiting of the shading coils 49 will cause the rotor 19 to rotate in the opposite direction. In effect, the saturable reactors 41 and 42 control the short circuiting of the shading coils. When the current flows through a saturating coil 43 the high permeability of the core 52 is largely used up or saturated so that the core can have little effect in opposing the flow of current through reactance coils 46. Hence the shading coils in series with these particular reactance coils are approximately short circuited. On the other hand, when saturating coil 43 carries relatively little current the core 52 greatly increases the reactance of coils 46 so that they oppose or retard the flow of current through the shading coils connected therewith.

With no voltage impressed on the wires 16 the voltage dividing resistance 35 will be adjusted so that conditions in the two reactors 41 and 42 are balanced and hence the various shading coils will have the current flow balanced therethrough so that the rotor 19 will not be driven. When a voltage is impressed on wires 16 by the control transformer 14, it will produce a change in the voltage impressed on grids 30. The direction of this change at any instant will depend upon the polarity of the voltage impressed on wires 16. With proper designing of the circuit, however, the polarity of the change of voltage on grid 30 will be in phase with the voltage on the voltage on one of the plate circuits and 180° out of phase with the other plate circuit.

Because of the opposite polarity of the plate circuits of the tube 28, the current in one will be increased while the current in the other is decreased. Thus one of the saturable reactors will become less saturated and the other more saturated so that one pair of shading coils 48 or 49 will have a much heavier flow of current therethrough than the other pair of shading coils. This will cause the motor to rotate in one direction or the other depending upon which shading coils have the heavier flow of current.

Rotation of rotor 19 will continue until it has driven the shaft 17 to a position required by the indications received over wires 13 at which time the voltage will no longer be applied to wires 16 and the balanced conditions of the reactors and the shading coils will be restored and the motor will stop. The instrument 11 to be controlled will have been driven in proportion to the rotation of shaft 17 and, hence, will accurately correspond to the position required by the indications received over wires 13.

The follow-up motor 18 may be of a variety of types. At present, it is preferred, when small loads are to be driven, to use Barber-Coleman reversible midget induction motor eYAZ—3313 115 v. 60 cycle 50 R. P. M.

It will be understood that similar follow-up systems can be used with other types of control. For example, a metal flag carried by a delicate indicating instrument could be positioned between two high frequency oscillating coils connected to an amplifying circuit somewhat similar to that illustrated and mounted to be moved by the follow-up system, so as to follow the indicator accurately as it moved toward one coil or the other, some appropriate controlled device moving with the coils.

The term "follow-up" is not intended to be limited to literal interpretation. For example, the system may be controlled by a fluctuating voltage and an offsetting adjustable voltage source driven by the follow-up motor to balance out the fluctuating voltage.

In all such forms of the invention it will be apparent that a very simple and dependable follow-up system has been provided. The follow-up motor 18 is controlled without any contact, thus eliminating contact trouble. Control circuits for this motor do not need to be capable of handling its main power since they only handle the power induced in the shading coils. In spite of the simplicity and dependability, the apparatus is highly accurate.

I claim:

1. The combination of a reversible motor having an energizing coil and having shading coils for each direction of rotation, and saturable reactors; the shading coils for each direction of rotation being connected in series with reactance coils of a saturable reactor, and means for varying the saturation of the saturable reactors to provide greater current flow in the shading coils for one direction or the other, including electronic tube units having grids jointly energized under control of a control circuit, and plates, and plate circuits of opposite phase, correlated to the phase of the control circuit, and including saturating coils on the saturable reactors energized independently of the shading coils, said control circuit including contact-free means controlled by said motor for selectively energizing said grids in accordance with the direction of departure of a member controlled by said motor for its correct position.

2. The combination of a reversible motor having an energizing coil and having shading coils for each direction of rotation, and saturable reactors; the shading coils for each direction of rotation being connected in series with reactance coils of a saturable reactor, and means for varying the saturation of the saturable reactors to provide greater current flow in the shading coils for one direction or the other, including electronic tube units having grids jointly energized under control of a control circuit, and plates, and plate circuits of opposite phase, correlated to the phase of the control circuit, and including saturating coils on the saturable reactors energized independently of the shading coils, said control circuit including the secondary winding of a rotary control transformer positioned by said motor, the primary of the control transformer being energized with a shifting neutral axis by the device to be followed.

3. A follow-up system including a receiving rotary transformer having a rotary primary adapted to be energized by a rotary sender, and a secondary, a reversible motor for controlling the rotor including an energizing coil and a pair of shading coils directionally controlling the motor operation by the relative current intensity therein, and a control amplifier including an input circuit responsive to the transformer secondary coil, a pair of output plate circuits differentially controlled by the input circuit and energized by the amplifier and a saturable reactor for each output circuit including a core, a saturating coil thereon connected in the associated output circuit, and coils on each core in circuit with one of the shading coils of the motor.

4. A follow-up system including a receiving rotary transformer having a rotary primary adapted to be energized by a rotary sender, and a secondary, a reversible motor for controlling the rotor including an energizing coil and a pair of secondary coils directionally controlling the motor operation by the relative current intensity therein, and a control amplifier including an input circuit responsive to the transformer secondary coil, a pair of output circuits differentially controlled by the input circuit and energized by the amplifier, a saturable reactor for each output circuit including a core, a saturating coil thereon connected in the associated output circuit, and coils on each core in circuit with one of the secondary coils of the motor, and a capacitor connected in each output circuit in parallel with the saturating coil to reduce the pulsations through the saturating coil.

GEORGE N. BURKHART, Jr.

REFERENCES CITED

The following references are of record in the file of this patent:

UNITED STATES PATENTS

| Number | Name | Date |
| --- | --- | --- |
| 2,068,490 | Hull | Jan. 19, 1937 |
| 2,115,086 | Riggs | Apr. 26, 1938 |
| 2,126,910 | Moseley | Aug. 16, 1938 |
| 2,310,955 | Hornfeck | Feb. 16, 1943 |